INVENTOR
John Ray Polston
BY
ATTORNEY

Patented Nov. 2, 1937

2,098,014

UNITED STATES PATENT OFFICE 2,098,014

PIPE LINE SYSTEM AND VALVE THEREFOR

John Ray Polston, Tulsa, Okla., assignor to Stanolind Pipe Line Company, Tulsa, Okla., a corporation of Maine Application July 11, 1936, Serial No. 90,159

6 Claims. (Cl. 137—78)

This invention relates to a valve and particularly to a combination back pressure control and check valve. This valve has particular application to use in connection with a pipe line pumping station but can be applied wherever a combination back pressure control and check valve is needed. The invention also relates to pipe line pumping station systems involving the use of this valve.

It is an object of my invention to produce a valve which will permit a constant back pressure on the pumps at a pumping station, which will pass oil or other fluid to storage when this pressure is exceeded, and which will permit the withdrawal of oil or other fluid from storage when the pressure decreases below a predetermined constant value. Another object of my invention is to produce a valve having one or more pressure controlled valve members and a check valve member combined within a single body. Still another object is to produce a valve of this type in which the valve members are readily removable from the body. It is a further object of my invention to provide a pipe line pumping station system having certain important advantages hereinafter fully described. Other and more detailed objects of my invention will become apparent as the description thereof proceeds.

My invention will be more particularly described with reference to the drawings which show specific embodiments of my invention and in which.

Figure 1:
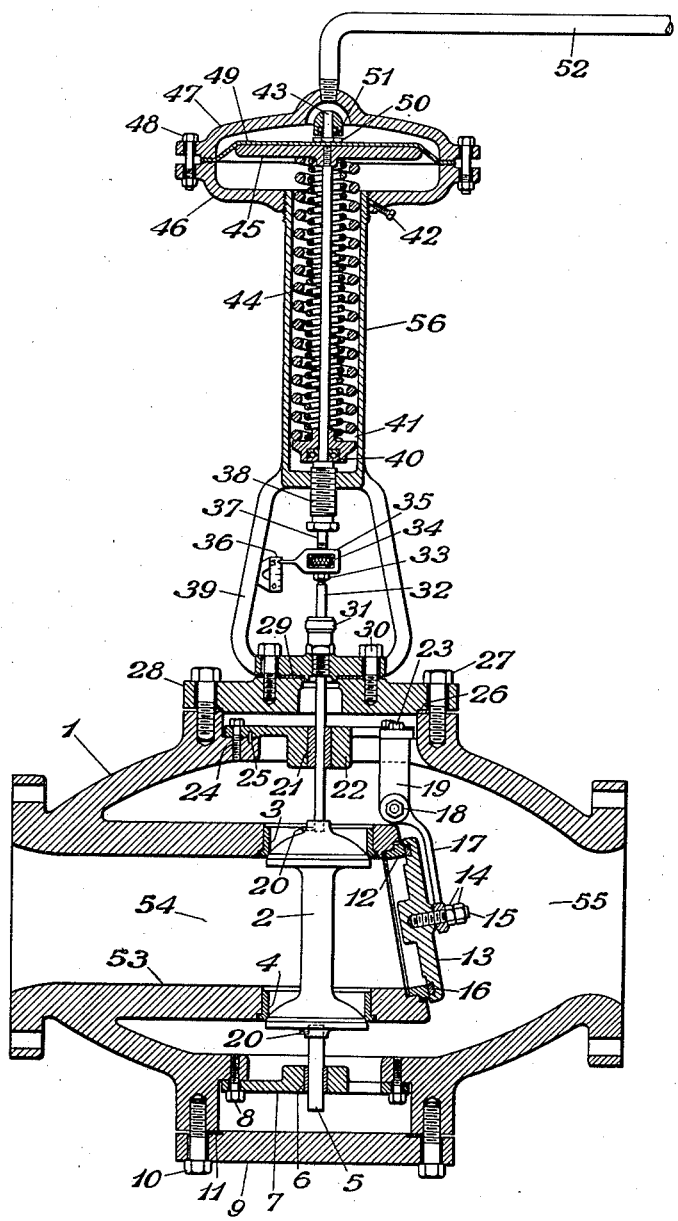
Figure 1 is an elevation of my new valve, partly in section.

Referring more particularly to Figure 1, a valve body 1 contains an innervalve 2 carrying upper and lower valve members seated respectively against upper valve seat 3 and lower valve seat 4. These valve members and seats are preferably of stainless steel. The upper valve member is smaller than the lower valve member and can pass through lower valve seat 4 so that innervalve 2 can be removed through the bottom of valve body 1.

Innervalve 2 carries an innervalve substem 5 which cooperates with lower guide bushing 6 in innervalve lower guide 7. Guide 7 is removably attached to body 1 by lower guide cap screws 8. The bottom of body 1 is closed by bottom plate 9 held in place by bottom plate cap screws 10. Bottom plate gasket 11 serves to prevent leakage.

The inwardly projecting portion 53 of valve body 1 carries a clapper valve seat 12 which cooperates with a check valve member or clapper 13. Portion 53 of body 1 together with the three valve members divides body 1 into two chambers 54 and 55.

Clapper 13 is held loosely in place by lock nuts 14 and stud bolt 15. It carries a ring 16 (preferably babbitt in a dovetailed annular groove) which forms a tight seal with valve seat 12. Clapper 13 is mounted on clapper hanger 17 but is free to wobble and rotate so that it will seat itself perfectly. Clapper hanger 17 is pivotally connected by clapper hanger bolt 18 with clapper hanger bracket 19.

Lower valve stem 32 screws into innervalve 2 and is locked in place by means of upper set screw 20. Similarly, substem 5 screws into innervalve 2 and is locked in place by lower set screw 20. Lower stem 32 passes through upper guide bushing 21 carried by innervalve upper guide 22. Clapper hanger 19 is fastened to upper guide 22 by cap screws 23. Upper guide 22 is removably affixed to body 1 by cap screws 24. Dowel pin 25 insures that guide 22 will be replaced accurately in position. The upper opening in body 1 is closed by means of body gasket 26, cap screws 27 and yoke plate 28. This yoke plate has a central opening which is closed in turn by yoke plate gasket 29, cap screws 30, stuffing box 31 and the base of yoke 39.

It will be noted that the whole check valve assembly including elements 12 to 19 inclusive can be removed through the top of valve body 1.

Lower stem 32 passes through upper guide bushing 21 and stuffing box 31. At its upper end it is affixed by means of stem connection lock nut 33 to stem connector and travel pointer 35 to which upper stem 37 is likewise connected by stem adjusting nut 34. Stem connector and travel pointer 35 cooperates with travel indicator 36 to permit an easy visual determination of the position of innervalve 2. Upper stem 37 passes through spring adjusting screw 38 which depends from spring casing 56. Spring casing 56 is supported by yoke 39. This spring casing encloses ball thrust bearing 40 which takes up the thrust and permits rotation between spring adjustment screw 38 and spring seat 41. Spring casing 56 also encloses one or preferably more than one spring 44.

At the top of spring casing 56 is a diaphragm casing made up of a lower part 46 and an upper part 47 held together by bolts 48. Lower diaphragm casing 46 is preferably threaded onto spring casing 56 as shown and is held in place by set screw 42. The compression on springs 44 can be adjusted by adjusting the position of lower diaphragm casing 46 on spring casing 56 as well as by adjusting screw 38.

Spring casing 56 and springs 44 are of considerable length since a large amount of travel is usually required corresponding to a small pressure change. The use of a plurality of springs helps give the necessary rigidity. In practice I use three concentric helical springs of different sizes.

At its upper end, upper stem 37 carries diaphragm plate 45 between which and seat 41 springs 44 are disposed. The diaphragm plate, the valve stems and innervalve 2 are thus all urged upward by springs 44. This upward motion is limited by diaphragm 49 and by travel stop 43 which is mounted on upper stem 37 above diaphragm nut 50 and is free to rotate on the upper stem by virtue of ball bearing 51 held in a ball bearing snap ring.

Diaphragm 49 passes over diaphragm plate 45 and is held between lower diaphragm casing 46 and upper diaphragm casing 47. This diaphragm is made of flexible material and where it is likely to come in contact with oil I prefer to use an oil resistant synthetic rubber-like material of the Duprene type.

Upper diaphragm casing 47 is threaded to receive pipe 52 through which a pressure is exerted. This pressure is in opposition to the force exerted by springs 44. When the pressure exerted on the top of diaphragm 49 overcomes the force of springs 44 the pressure controlled valve members begin to open.

Thus with this combination pressure controlled and check valve, fluid motion through the valve is possible in one direction (through the check valve) whenever there is a substantial pressure differential in this direction while fluid motion is possible in the other direction only in response to a pressure of predetermined magnitude.

Figure 2:
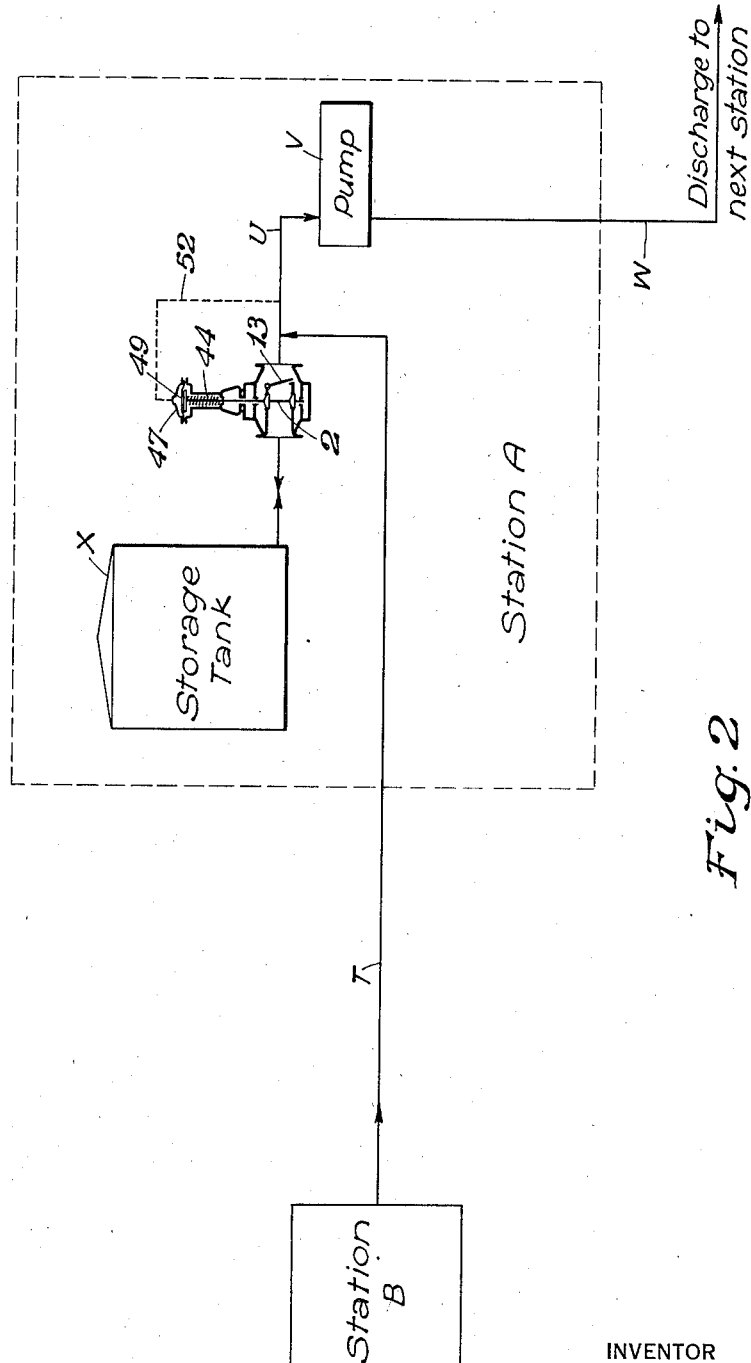
Figure 2 is a diagram of a simple pipe line pumping station system showing one way in which this valve is used.

One important use for such a valve is illustrated in Figure 2 which is a greatly simplified diagram showing a part of a pipe line system such as is used in the oil industry.

In Figure 2, oil is being pumped from station B to station A through one or more pipe lines T by means of a pump at station B. The oil received at station A passes through a single pipe line U and one or more pumps V and, its pressure having been boosted, passes out through one or more lines W to the next station. Storage tank X is provided for emergency purposes and to take up any difference in the rates of pumping at stations A and B. In the prior practice tank X was merely floated on the line.

The use of my valve interposed between tank X and line U is highly advantageous since it makes it possible to keep a back pressure on the suction side of pump V. Furthermore this valve makes it possible to control this back pressure accurately.

As shown, my valve is interposed between line U and working tank X. A small pilot line 52 connects upper diaphragm casing 47 with pipe line U. Springs 44 are set at any desired operating pressure, e. g., 20 pounds per square inch gage. When this pressure is reached in pipe line U, as when station B is pumping faster than station A, the back pressure controlled valve member 2 begins to open and liquid begins to flow to tank X. The valve reaches the full open position at about 27 pounds per square inch gage.

On the other hand when station B is pumping less liquid than station A the back pressure controlled valve members remain in closed position and the remaining liquid to supply pump B is taken from tank X through the check valve incorporated in my valve structure.

I have found that the use of this valve reduces pump slippage very markedly since the pumps fill better when they have a back pressure on the suction side. Maintenance costs are lowered on account of the pumps filling better. Furthermore the pump valves are more quiet and the pump engine speed is more nearly constant.

The use of this valve at pipe line pumping stations cuts down the size or number of suction lines between working tank and pumps since the bulk of the liquid goes directly to the pumps.

By the use of this valve it is possible to use pumps running at higher speeds, hence the initial cost of pumping units is cut down quite considerably. As pump speeds are increased the requirements for heavy duty bearings, gears, shafting, pump frames and valve chests are lessened and it is possible to use a smaller, lighter, cheaper pump. Furthermore, the prime mover used to operate the pumps can be speeded up, affording a further saving in initial investment.

While I have described my invention in connection with a specific embodiment thereof it is to be understood that I am not limited thereby but only to the subject matter of the appended claims which should be construed as broadly as the prior art will permit.

I claim:

1. A unitary valve comprising a valve body divided into two chambers, a valve member controlling an opening between said two chambers, a valve stem attached to said valve member, a spring acting on said valve stem, a diaphragm acting on said valve stem, means for exerting pressure on said diaphragm in opposition to the force of said spring, the position of said valve member being controlled by the relative magnitude of the opposing forces, and a check valve member controlling a second opening between said two chambers of said valve body.

2. A valve according to claim 1 provided with means for removing each of said valve members from said valve body.

3. A unitary valve comprising a valve body divided into two chambers, two integrally connected back pressure controlled valve members disposed within said valve body in vertical relationship to each other and controlling openings between said two chambers of said valve body, one of said valve members being smaller than the other, seats for each of said valve members, means to permit the removal of said valve members from said valve body by passing the smaller of said valve members through the seat of the larger of said valve members, a gravity actuated clapper type check valve assembly disposed within one part of said valve body controlling another opening between said two chambers of said valve body and means to permit the removal of said check valve assembly from said valve body.

4. A unitary valve, comprising a valve body divided into a first chamber and a second chamber, a plurality of valve means controlling communication between said first chamber and said second chamber, comprising a first valve means and a second valve means, means responsive to a predetermined pressure in said second chamber and independent of the pressure within said first chamber for controlling the operation of said first valve means, said second valve means being operable in response to the pressure in said second chamber falling below the pressure in said first chamber.

5. In a fluid transportation system of the type wherein there is provided a plurality of widely separated pumping stations, pipe line means connecting said stations in series relation for successive delivery of fluid by a preceding pumping station to a leading pumping station, the combination therewith of storage means located at one of said stations, branch line means connecting said storage means with said pipe line means adjacent the point of delivery to the suction side of a leading pump, including a first valve means and a second valve means, said first valve means being made responsive to a predetermined maximum pressure in said delivery line adjacent said point of delivery to said leading pump and independent of the head in said storage means for opening said first valve means to effect flow of fluid from said delivery line into said storage means, said second valve means being operable in response to the pressure in said delivery line falling below the pressure due to the head in said storage means to deliver fluid from said storage means to the suction side of said leading pump.

6. In a pipe line system for transporting fluids, a first pumping station, a second pumping station distantly located with respect to said first pumping station and connected thereto by a pipe line for delivering fluid from said first station to said second station to be in turn pumped to a third station, storage means located at said second station, branch line means connecting said storage means with said pipe line means adjacent its point of delivery to the suction side of said second pump, including a first valve means and a second valve means, said first valve means being made to operate in response to a predetermined maximum pressure on the suction side of said second pump and independent of the head of fluid in said storage means for opening said first valve means to effect flow of fluid from said delivery line into said storage means, said second valve means being operable in response to a drop in pressure on the suction side of said pump below the pressure due to the fluid head in said storage means, whereby the pressure on the suction side of said second pump is limited to a constant predetermined maximum and said suction side of said pump is supplied with fluid from said storage means in response to a drop in the pressure delivered by said preceding pump below the pressure exerted by the head of the fluid within said storage means, thus making it possible to operate with a head of fluid in said storage means which corresponds to only a fraction of the pressure at which said first named valve means is set to operate.

JOHN RAY POLSTON.